US006733810B2

(12) United States Patent
Roth

(10) Patent No.: US 6,733,810 B2
(45) Date of Patent: May 11, 2004

(54) METHOD AND APPARATUS FOR TREATING A PH ENHANCED FOODSTUFF

(75) Inventor: Eldon Roth, Dakota Dunes, SD (US)

(73) Assignee: Freezing Machines, Inc., Dakota Dunes, SD (US)

( * ) Notice: Subject to any disclaimer, the term of this patent is extended or adjusted under 35 U.S.C. 154(b) by 0 days.

(21) Appl. No.: 10/120,729

(22) Filed: Apr. 11, 2002

(65) Prior Publication Data

US 2003/0194474 A1 Oct. 16, 2003

(51) Int. Cl.[7] .................... A23B 4/09; A23L 1/314; A23L 1/317
(52) U.S. Cl. .................. 426/319; 426/320; 426/513; 426/524; 426/641; 426/646
(58) Field of Search ................. 426/319, 320, 426/513, 517, 519, 524, 641, 646

(56) References Cited

U.S. PATENT DOCUMENTS

| | | |
|---|---|---|
| 3,023,109 A | 2/1962 | Hines |
| 4,192,899 A | 3/1980 | Roth |
| 4,919,955 A | 4/1990 | Mitchell |
| 5,393,547 A | 2/1995 | Balaban et al. |
| 5,433,142 A | 7/1995 | Roth |
| 5,871,795 A | 2/1999 | Roth |
| 6,054,164 A | 4/2000 | Roth |
| 6,142,067 A | 11/2000 | Roth |

FOREIGN PATENT DOCUMENTS

| | | |
|---|---|---|
| JP | 64-39965 | 2/1989 |
| SU | 528923 | 12/1976 |

OTHER PUBLICATIONS

Jay, J.M., "Sources, Types, Incidence, and Behavior of Micro–organisms in Food." Modern Food Microbiology, 3rd Ed., Ch. 3, 52–56; Ch. 4, 71–72, 1986.

*Primary Examiner*—Arthur L. Corbin
(74) *Attorney, Agent, or Firm*—Russell D. Culbertson; Shaffer & Culbertson, L.L.P.

(57) ABSTRACT

A method of producing a pH enhanced foodstuff includes increasing the pH of an initial foodstuff, preferably by placing an initial foodstuff in contact with ammonia gas or aqueous ammonia (54) and applying mechanical action to the material (56). After the pH adjustment, the method includes reducing at least the surface temperature of the pH enhanced foodstuff to below the freezing temperature of the pH enhanced foodstuff (58). The method then includes placing the frozen or partially frozen pH enhanced foodstuff in contact with carbon dioxide gas while maintaining the surface temperature of the pH enhanced foodstuff below the freezing temperature of the material (60). The carbon dioxide treatment may be performed in a mixing vessel (24) fitted with agitators (25) and suitable connections for producing a carbon dioxide gas atmosphere in the vessel.

20 Claims, 2 Drawing Sheets

METHOD AND APPARATUS FOR TREATING A PH ENHANCED FOODSTUFF

TECHNICAL FIELD OF THE INVENTION

This invention relates to the production of pH enhanced foodstuffs, especially pH enhanced comminuted meats. The invention includes a method of producing pH enhanced foodstuffs, and an apparatus and method for treating foodstuffs after pH enhancement.

BACKGROUND OF THE INVENTION

It may be desirable or helpful in processing a foodstuff to increase the pH of the foodstuff over that naturally found in the material. A foodstuff that has been treated to exhibit an increased pH may be referred to as a pH enhanced foodstuff. For example, U.S. Pat. No. 5,871,795 discloses an apparatus and process for adding ammonia gas to unfrozen meat products to produce a pH enhanced meat product. U.S. Pat. No. 6,142,067 discloses another method and apparatus for applying ammonia gas or aqueous ammonia to comminuted meat to provide a uniformly elevated pH in the treated product. The system shown in U.S. Pat. No. 6,142,067 first adds ammonia gas or aqueous ammonia to an initial comminuted meat, and then comminutes the meat to distribute the added ammonia throughout the meat and drive the ammonia into the material.

One of the limitations on enhancing the pH of a foodstuff is the objectionable odor that may remain in the foodstuff after treatment. This is particularly true when relatively large pH adjustments are made using ammonia. U.S. Pat. No. 6,142,067 addresses the problem of ammonia odor in the treated meat by comminuting the meat after contact with ammonia. This further comminution has been found to help distribute the ammonia in the foodstuff. It is also believed that the pressure applied in comminution helps drive the ammonia into the foodstuff. In any event, the method of further comminuting a previously comminuted meat that has been exposed to ammonia has been found to reduce or eliminate the objectionable ammonia odor in many cases.

U.S. Pat. No. 5,871,795 discloses adding a pH reducing material such as carbon dioxide gas after the ammonia gas treatment. The added carbon dioxide tends to displace free ammonia remaining after the earlier treatment and thus reduce any ammonia odor. However, the carbon dioxide gas treatment disclosed in U.S. Pat. No. 5,871,795 is performed on the unfrozen meat and reduces the pH of the treated material.

It may be advantageous in certain circumstances to maintain a relatively high pH in a pH enhanced foodstuff. However, it is desirable to achieve this relatively high pH without any detrimental effects from the pH increasing material. In particular, it is desirable to use ammonia to produce pH enhanced foodstuffs having a relatively large pH adjustment, but with little or no objectionable ammonia odor.

SUMMARY OF THE INVENTION

The present invention provides a pH enhanced foodstuff production method that eliminates or reduces the odor of the pH increasing material in the treated product. This reduction or elimination of odors from the pH increasing material is accomplished without substantially affecting the pH of the treated product.

The method of producing a pH enhanced foodstuff according to the invention includes increasing the pH of an initial foodstuff, preferably by placing an initial foodstuff in contact with ammonia gas or aqueous ammonia and applying mechanical action to the material. After the pH adjustment, the method includes reducing at least the surface temperature of the pH enhanced foodstuff to below the freezing temperature of the pH enhanced foodstuff. The method then includes placing the fully frozen or partially frozen pH enhanced foodstuff in contact with carbon dioxide gas while maintaining the surface temperature of the pH enhanced foodstuff below the freezing temperature of the material.

As used in this disclosure and the accompanying claims the "freezing temperature" of the foodstuff refers to the initial freezing temperature at which ice crystals begin to form in the material. A foodstuff in which substantially all unbound water is in crystalline form will be referred to as a "fully frozen" foodstuff. This fully frozen foodstuff is to be distinguished from a foodstuff that has its entire volume at a temperature just below the freezing temperature of the foodstuff. In this latter case, ice crystals will be present, but substantial amounts of liquid free water may be present in the material. A foodstuff in such a condition will be referred to as a "thoroughly frozen" foodstuff in this disclosure. A "partially frozen" foodstuff will refer to a foodstuff that has its surface at a temperature below the freezing temperature of the material, while the interior temperature may still be above the freezing temperature.

Rather than a complete pH enhanced foodstuff production process, the invention may be applied as a treatment for pH enhanced foodstuffs that have already undergone pH enhancement. Whether the process is defined as a process of producing pH enhanced foodstuffs or a process of treating previously produced pH enhanced foodstuffs, the invention is particularly useful in producing pH enhanced comminuted meats and defatted meats that may be mixed with other materials to make a final product.

The preferred form of the invention applied to comminuted foodstuffs includes forming the pH enhanced foodstuff into relatively small pieces or units of fully frozen or partially frozen material prior to the carbon dioxide gas contacting step. These frozen or partially frozen units are then preferably mixed together or otherwise agitated in a carbon dioxide gas atmosphere to provide the desired carbon dioxide contact.

The apparatus for treating pH enhanced foodstuffs according to invention includes a mixing vessel which houses at least one agitating or mixing element driven by a suitable drive device. The mixing vessel includes a carbon dioxide inlet connected to a carbon dioxide supply. Carbon dioxide may be added in gaseous form or as solid carbon dioxide pellets or chips which sublime to form carbon dioxide gas in the mixing vessel.

The present invention facilitates the elimination or reduction of pH increasing material odor in the frozen pH enhanced foodstuff, but does not significantly reduce the pH of the foodstuff. Thus, the pH enhanced foodstuff may be taken to relatively high pH levels with gaseous or aqueous ammonia and may be maintained at that relatively high pH level, without producing the objectionable ammonia odor. This pH enhanced foodstuff may then be mixed with other materials or otherwise used to form a final product.

These and other objects, advantages, and features of the invention will be apparent from the following description of the preferred embodiments, considered along with the accompanying drawings.

DESCRIPTION OF PREFERRED EMBODIMENTS

Figure 1:
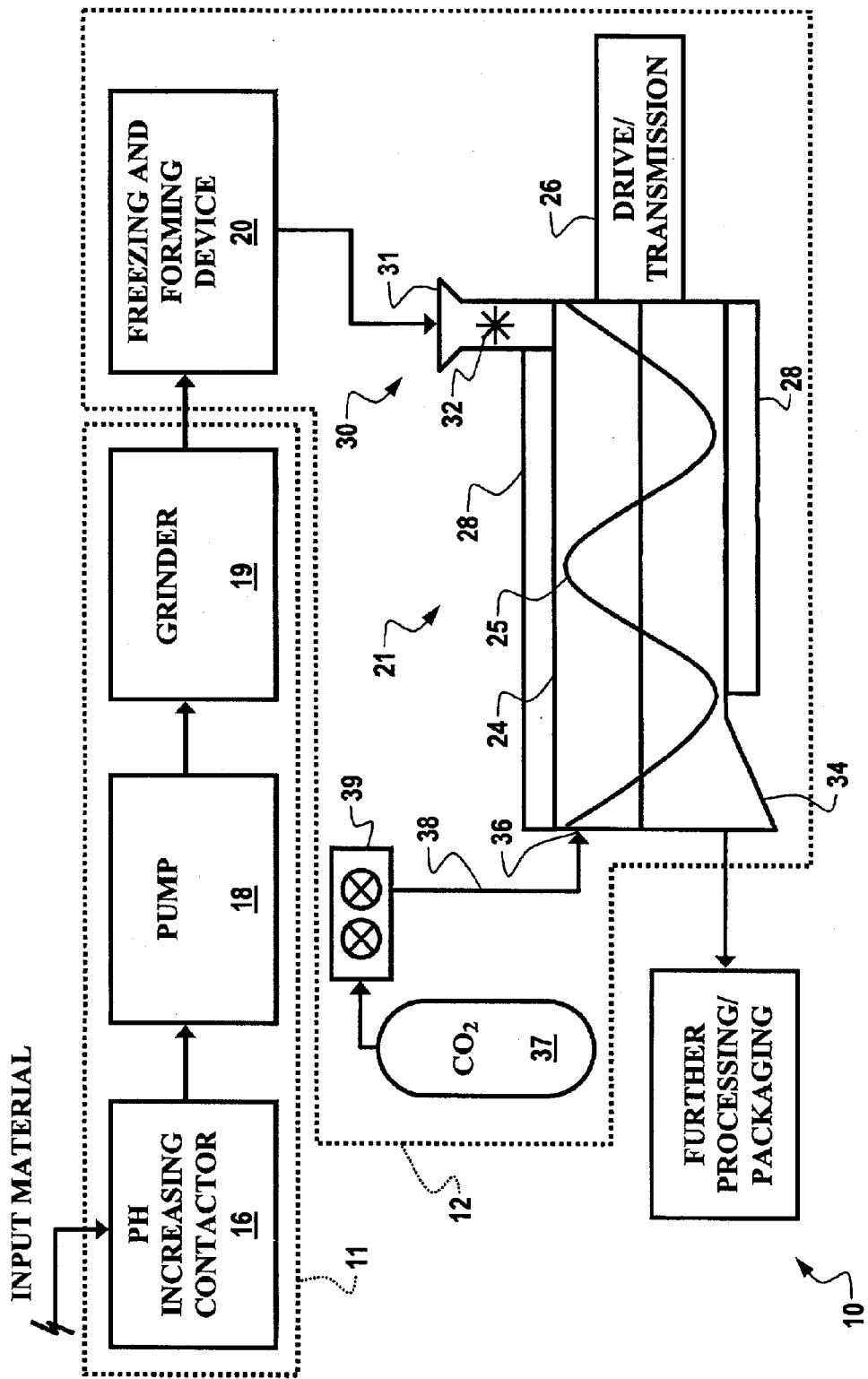
FIG. 1 is a schematic diagram showing a pH enhanced foodstuff production system embodying the principles of invention.

FIG. 1 shows a preferred system 10 for producing a comminuted pH enhanced foodstuff, particularly comminuted meat. System 10 is made up of two primary components shown in dashed boxes 11 and 12. The collection of elements in dashed box 11 together represent an arrangement for receiving an initial comminuted foodstuff and adjusting the pH of the initial foodstuff to produce a pH enhanced foodstuff. The collection of elements shown in dashed box 12 represent an arrangement for first placing the pH enhanced foodstuff in condition for the treatment according to the present invention, and then treating the pH enhanced foodstuff.

The pH enhanced foodstuff producing components in dashed box 11 include a pH increasing material contactor 16. Contactor device 16 may be of the type shown in U.S. Pat. No. 6,142,067, the entire content of which is hereby incorporated herein by this reference. This contactor arrangement includes generally a perforated conduit or passage (not shown in FIG. 1). The foodstuff to be treated is pumped or otherwise forced axially through the conduit while the pH increasing material is allowed to flow into the conduit through the perforations. Thus, the pH increasing material is allowed to come in contact and mix with the initial foodstuff.

The preferred pH increasing material comprises either ammonia gas or aqueous ammonia (ammonium hydroxide solution). However, other forms of pH increasing material may be used according to the present invention. Generally, any material suitable for use in foodstuffs and capable of providing hydroxide ions in the foodstuff may be used as a pH increasing material within the scope of the invention. The pH increasing material may be in relatively pure form or may be mixed with other materials suitable for use in food processing.

The foodstuff and entrained pH increasing material exiting contactor 16 are preferably placed under pressure by suitable means. System 10 shown in FIG. 1 includes a pump 18 for placing the foodstuff and pH increasing material under the desired pressure. Pump 18 may be a reciprocating pump such as that shown in U.S. Pat. No. 5,871,795. The entire content of this prior patent is incorporated herein by this reference. Pump 18 may be operated to place the foodstuff and pH increasing material under a pressure above the vapor pressure of the pH increasing material at the temperature of the foodstuff.

Although the preferred system 10 shown in FIG. 1 includes pump 18, other pH enhanced foodstuff production systems may omit a pump down stream of contactor 16. Still, other systems within the scope of the present invention may combine the pump and contactor functions as shown in U.S. Pat. No. 5,871,795. All of these variations are within the scope of the pH enhanced foodstuff production method according to the present invention.

After pump 18, or directly after pH increasing material contactor 16 where the pump is omitted, the foodstuff and entrained pH increasing material are preferably directed to a comminuting device such as grinder 19 shown in FIG. 1. Grinder 19 may be a plate type grinder such as that shown and described in U.S. Pat. No. 6,142,067, in which the comminuted foodstuff is pressed through the openings of a grinder plate while a blade periodically passes over the plate openings to cut the foodstuff and allow the severed pieces to pass completely through the respective openings. A bowl chopper or other suitable comminuting device may be used in lieu of grinder 19.

The pH enhanced foodstuff exiting grinder 19 is directed to a freezing and forming device 20 shown as part of the treatment apparatus in dashed box 12. This device may comprise a roller-type freezer such as that shown in U.S. Pat. No. 4,192,899, the entire content of which is incorporated herein by this reference. In such a device, the pH enhanced comminuted foodstuff is applied in a thin sheet on the surface of a large refrigerated rotating drum. The thin sheet of pH enhanced foodstuff eventually reaches its freezing temperature as the foodstuff is compacted against the drum surface and the drum rotates the foodstuff from the original application point to a sheet removal point. The partially or thoroughly frozen sheet of foodstuff is peeled or otherwise separated from the drum at the removal point and then cut to form chips of material. The preferred chips or units of thoroughly frozen or partially frozen pH enhanced foodstuff formed by device 20 may be on the order of ⅛ inch to ¼ inch thick, ½ inch wide, and ½ inch long. Larger units of frozen pH enhanced foodstuff may be employed in the invention, however, the units should be relatively thin in any case to accommodate the treatment arrangement shown in dashed box 12 and any further processing equipment down stream from the treatment components in dashed box 12.

The frozen chips or units of pH enhanced foodstuff exiting freezing and forming device 20 are directed by suitable means to the treatment apparatus 21. Treatment apparatus 21 preferably comprises a jacketed blender including a blending or mixing vessel 24 made of a material such as stainless steel that is suitable for handling foodstuffs. One or more agitating or blending elements 25 are mounted within vessel 24, with each being adapted to be driven by a drive motor through suitable transmission. The drive motor and associated transmission are shown diagrammatically at block 26 in FIG. 1. Agitating elements 25 may comprise paddles or helical ribbon-type devices, for example. A suitable jacket 28 surrounds at least portions of mixing vessel 24. A refrigerant fluid may be circulated through jacket 28 to control and preferably reduce the temperature of the mixing vessel contents as will be discussed below in reference to FIG. 2.

The units of at least partially frozen pH enhanced foodstuff enter mixing vessel 24 through a pH enhanced foodstuff inlet 30. The illustrated inlet arrangement 30 includes a hopper 31 which directs material to a star feeder 32 for metering the frozen units into vessel 24. Treated units of pH enhanced foodstuff exit mixing vessel 24 through an outlet chute 34 shown at the end of vessel 24 opposite to the inlet arrangement 30. In the preferred form in the invention agitating elements 25 within mixing vessel 24 may be driven so as to urge the frozen pH enhanced units to outlet chute 34. An auger or other transport arrangement may also be associated with outlet chute 34 for removing the units of pH enhanced foodstuffs from mixing vessel 24.

The arrangement depicted in FIG. 1 facilitates continuous operation through mixing vessel 24. However, the invention is not limited to such continuous processing. Alternatively, the jacketed blender may be operated in a batch mode. In batch mode, a lid or other inlet to the vessel may be opened periodically to load units of pH enhanced foodstuff into the vessel. After the desired treatment in the vessel, an outlet opening may be opened and the treated frozen units of pH enhanced foodstuff may be removed by suitable means.

Mixing vessel 24 is fitted with a carbon dioxide inlet 36 which is connected to a carbon dioxide supply 37 through a supply conduit 38. The preferred carbon dioxide supply 37 comprises a vessel adapted to hold carbon dioxide under high pressure. A suitable valving and pressure regulating arrangement 39 is associated with the carbon dioxide supply 37 for metering carbon dioxide into mixing vessel 24 under an appropriate pressure to create the desired carbon dioxide atmosphere within the vessel as will be described below with reference to FIG. 2.

Alternatively to injecting carbon dioxide gas into the vessel, flakes or particles of solid carbon dioxide may be sprayed or otherwise added to mixing vessel 24. These solid particles of carbon dioxide quickly sublime at the relatively high temperature and low pressure within mixing vessel 24 to produce the desired carbon dioxide atmosphere.

The treated pH enhanced foodstuff units exiting mixing vessel 24 are transported by a suitable arrangement (not shown) to devices for further processing or for packaging and storage. The further processing elements may include a manipulating device such as the roller-type device or block forming device described in detail in U.S. Pat. No. 6,054,164. Such further processing devices will not be described further here so as not to obscure the invention in unnecessary detail. Details of any packaging arrangements are similarly omitted from this disclosure.

Figure 2:
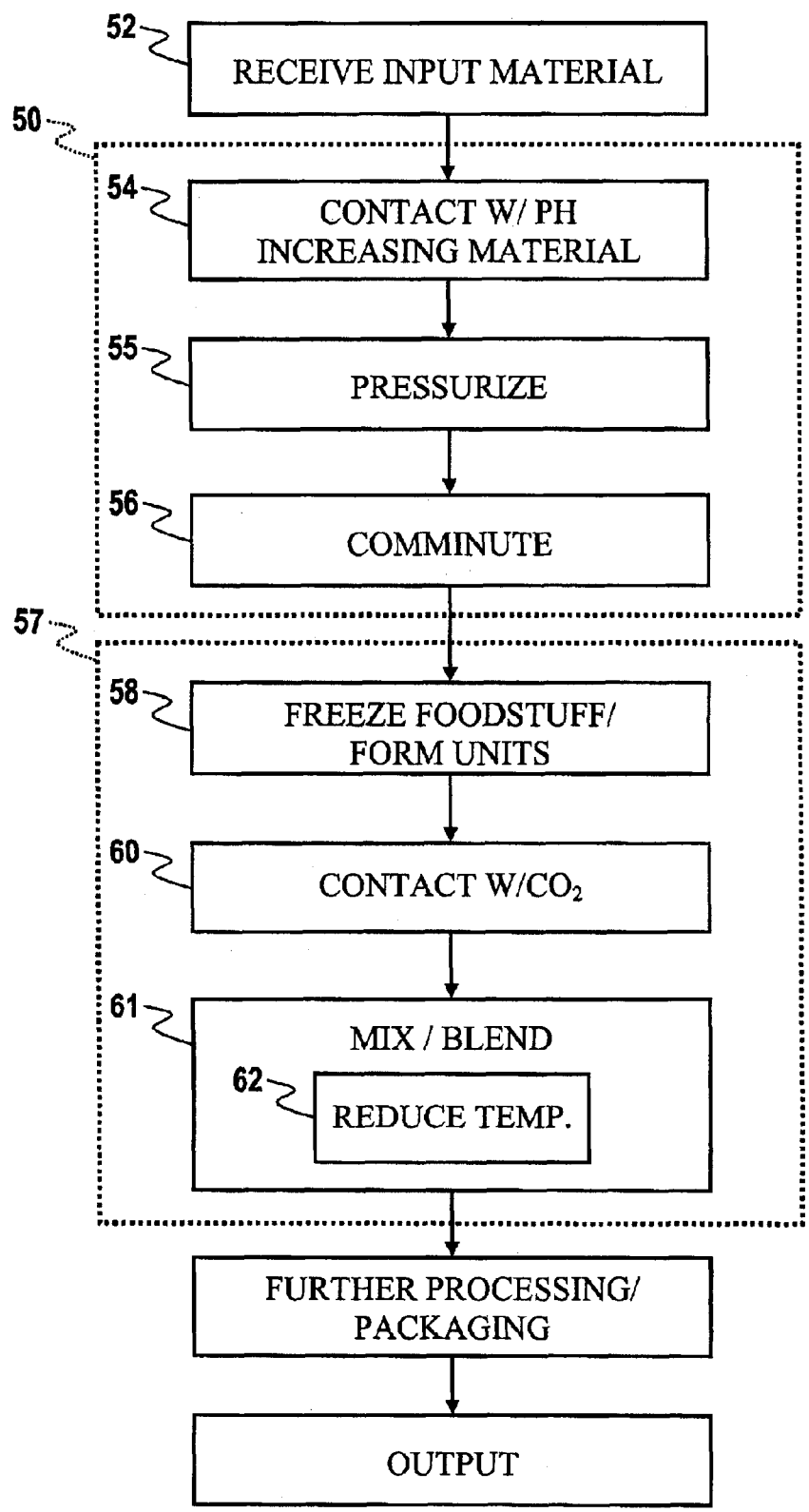
FIG. 2 is a flow chart showing the process steps according to the present invention.

The method of producing pH enhanced foodstuffs and treating previously produced pH enhanced foodstuffs according to the invention may be described with reference to FIG. 1 and to the flow chart shown in FIG. 2. Dashed box 50 in FIG. 2 shows steps for receiving an initial foodstuff and producing a pH enhanced foodstuff for treatment according to present invention. Dashed box 51 shows the steps for placing the pH enhanced foodstuff in a form for treatment according to the present invention and the treatment steps themselves.

Referring to dashed box 50 in FIG. 2, after receiving the initial material, at block 52, the method includes contacting the initial foodstuff with a pH increasing material as shown at block 54. Contacting the initial foodstuff with a pH increasing material is preferably performed with contacting arrangement 16 described with reference to FIG. 1. After contacting the initial foodstuff with the pH increasing material, the resulting mixture of foodstuff in contact with pH increasing gas may be pressurized as shown at process block 55. This pressurization step, although not necessary for producing pH enhanced foodstuffs has been found to be advantageous particularly for large pH adjustments, and may be performed using a pump such as that described above with reference to numeral 18 in FIG. 1.

Whether the foodstuff and pH increasing material are pressurized or not, the preferred pH enhanced foodstuff production technique includes comminuting or further comminuting the foodstuff after contact with the pH increasing material. This comminuting step is shown at block 56 in FIG. 2 and may be accomplished with a grinder such as grinder 19 shown in FIG. 1 or some other comminuting device such as a bowl chopper.

The pH enhanced foodstuff treatment method according to the invention operates on pH enhanced foodstuff having at least a surface temperature below the freezing temperature of the material. Thus, FIG. 2 shows the step of freezing the pH enhanced foodstuff at process block 58. The foodstuff may be thoroughly frozen, that is, with the entire volume placed at a temperature below the freezing temperature of the material. However, the interior of foodstuff may not be fully frozen during processing according to the invention or at least at the start of processing. The present treatment process is preferably applied to units of the surface frozen, thoroughly frozen, or fully frozen pH enhanced foodstuff. The process step at block 58 therefore indicates that the pH enhanced foodstuff is formed into units of material in conjunction with freezing. The freezing and forming steps are shown at the single process block 58 in FIG. 2 because the two steps are preferably performed in rapid succession by a roller-type freezer and stamping device such as that described at element 20 in FIG. 1. However, it will be appreciated that the forming step may be accomplished in substantially any manner either before or after freezing.

Whether the pH enhanced foodstuff is formed into a number of small units or otherwise, the treatment method shown in dashed box 51 in FIG. 2 includes contacting the surface of the frozen or surface frozen pH enhanced foodstuff with carbon dioxide gas. This carbon dioxide gas contact shown at process block 60 has been found to eliminate or reduce pH increasing material odors in the frozen pH enhanced material. However, the contact between the carbon dioxide gas and frozen surfaces of pH enhanced foodstuff does not significantly reduced the overall pH of the foodstuff. Where the foodstuff comprises a pH enhanced meat, for example, meat surface temperatures between 28 degrees Fahrenheit and 10 degrees Fahrenheit will prevent significant changes in the overall pH of the pH enhanced material. Generally the lower the temperature below the initial freezing point of the foodstuff, the less impact on the overall pH of the foodstuff.

The carbon dioxide gas contacting step may be performed by simply passing the frozen pH enhanced foodstuff through a carbon dioxide gas atmosphere. However, in the preferred form of the invention shown in FIG. 1, the carbon dioxide contacting step includes mixing or blending small frozen units of the pH enhanced foodstuff in a carbon dioxide gas atmosphere as shown at process block 61 in FIG. 2. In either case, the carbon dioxide gas atmosphere may be substantially pure carbon dioxide gas or may comprise carbon dioxide mixed with other gasses. The carbon dioxide should, however, make up the majority of the treatment gas.

As indicated at process block 62, the temperature of the pH enhanced foodstuff may be reduced during processing according to the invention. FIG. 2 indicates that the temperature reducing step is performed during mixing in the carbon dioxide gas atmosphere. The jacketed blender described with reference to FIG. 1 is suitable for simultaneously mixing the units of pH enhanced foodstuff and reducing the temperature of the units. For example, a jacketed blender may receive units of pH enhanced foodstuff at approximately 28 degrees Fahrenheit and reduce the temperature of the units during mixing to approximately 10 degrees Fahrenheit. However, the temperature reduction may be performed separately from mixing or may be performed in variations of the present process using no mixing step.

The material resulting after the process steps shown in dashed box 51 represents the output of the process. The final treated product may be subjected to further processing such as physical manipulation as described in U.S. Pat. No. 6,054,164, and then packaged for storage or shipment. These further processing and packaging steps are omitted from FIG. 2.

The above described preferred embodiments are intended to illustrate the principles of the invention, but not to limit the scope of the invention. Various other embodiments and modifications to these preferred embodiments may be made by those skilled in the art without departing from the scope of the following claims.

What is claimed is:

1. A method for producing a pH enhanced comminuted foodstuff, the method including the steps of:
   (a) increasing the pH of the comminuted foodstuff to produce a pH enhanced foodstuff;
   (b) forming the pH enhanced foodstuff into a number of units, the units having a surface temperature below the freezing temperature of the pH enhanced foodstuff; and
   (c) placing the units in contact with carbon dioxide gas while maintaining the surface temperature of the units below the freezing temperature of the pH enhanced foodstuff.

2. The method of claim 1 wherein the step of increasing the pH of the comminuted foodstuff includes the steps of:
   (a) placing the comminuted foodstuff in contact with a pH increasing material; and
   (b) applying mechanical action to the comminuted foodstuff in contact with the pH increasing material.

3. The method of claim 2 wherein the step of applying mechanical action to the comminuted foodstuff includes further comminuting the comminuted foodstuff.

4. The method of claim 2 wherein the pH increasing material comprises ammonia gas or an ammonium hydroxide solution.

5. The method of claim 1 wherein the step of placing the units in contact with carbon dioxide gas includes the step of mixing the units in a carbon dioxide gas atmosphere.

6. The method of claim 5 further including the step of reducing the temperature of the units while the units are being mixed in the carbon dioxide gas atmosphere.

7. The method of claim 6 wherein the step of reducing the temperature of the units while the units are being mixed in the carbon dioxide gas atmosphere includes reducing the surface temperature of the units to no more than approximately 10 degrees Fahrenheit.

8. The method of claim 5 wherein the step of mixing the units is performed in a mixing vessel and wherein the carbon dioxide gas atmosphere is created in the mixing vessel by adding carbon dioxide gas or solid carbon dioxide to the mixing vessel.

9. The method of claim 1 wherein the comminuted foodstuff comprises a defatted meat.

10. The method of claim 1 wherein the step of forming the pH enhanced foodstuff into units having a surface temperature below the freezing temperature of the pH enhanced foodstuff includes the steps of:
    (a) forming a sheet of the comminuted pH enhanced foodstuff and cooling the sheet of material to a temperature below the freezing temperature of the pH enhanced foodstuff; and
    (b) separating the frozen sheet of comminuted pH enhanced foodstuff into a number of chips.

11. A comminuted foodstuff produced in accordance with the method of claim 1.

12. A method for treating a pH enhanced foodstuff, the method including the steps of:
    (a) reducing the temperature of the surfaces of the pH enhanced foodstuff to below the freezing temperature of the pH enhanced foodstuff; and
    (b) placing the pH enhanced foodstuff in contact with carbon dioxide gas while maintaining the temperature of the surfaces of the pH enhanced foodstuff below the freezing point of the pH enhanced foodstuff.

13. The method of claim 12 wherein the step of planing the pH enhanced foodstuff in contact with carbon dioxide gas includes the step of mixing units of the pH enhanced foodstuff in a carbon dioxide gas atmosphere.

14. The method of claim 13 further including the step of reducing the temperature of the units while the units are being mixed in the carbon dioxide gas atmosphere.

15. The method of claim 14 wherein the step of reducing the temperature of the units while the units are being mixed in the carbon dioxide gas atmosphere includes reducing the surface temperature of the units to no more than approximately 10 degrees Fahrenheit.

16. The method of claim 14 wherein the step of mixing the units is performed in a mixing vessel and wherein the carbon dioxide gas atmosphere is created in the mixing vessel by adding carbon dioxide gas or solid carbon dioxide to the mixing vessel.

17. The method of claim 14 wherein the step of mixing the units is performed in a mixing vessel and wherein the carbon dioxide gas atmosphere is created in the mixing vessel by adding carbon dioxide gas or solid carbon dioxide to the mixing vessel.

18. The method of claim 12 wherein the foodstuff comprises a defatted comminuted meat.

19. A method for treating a pH enhanced foodstuff, the method including the steps of:
    (a) placing units of the pH enhanced foodstuff in a carbon dioxide gas atmosphere while maintaining the temperature of the surfaces of the units below the freezing point of the pH enhanced foodstuff; and
    (b) mixing the units in the carbon dioxide gas atmosphere.

20. The method of claim 19 further including the step of reducing the temperature of the units while the units are being mixed in the carbon dioxide gas atmosphere.

* * * * *